Feb. 1, 1966  E. A. PROCTOR  3,232,012
AUXILIARY WIND BRACING
Filed Feb. 15, 1963  2 Sheets-Sheet 1
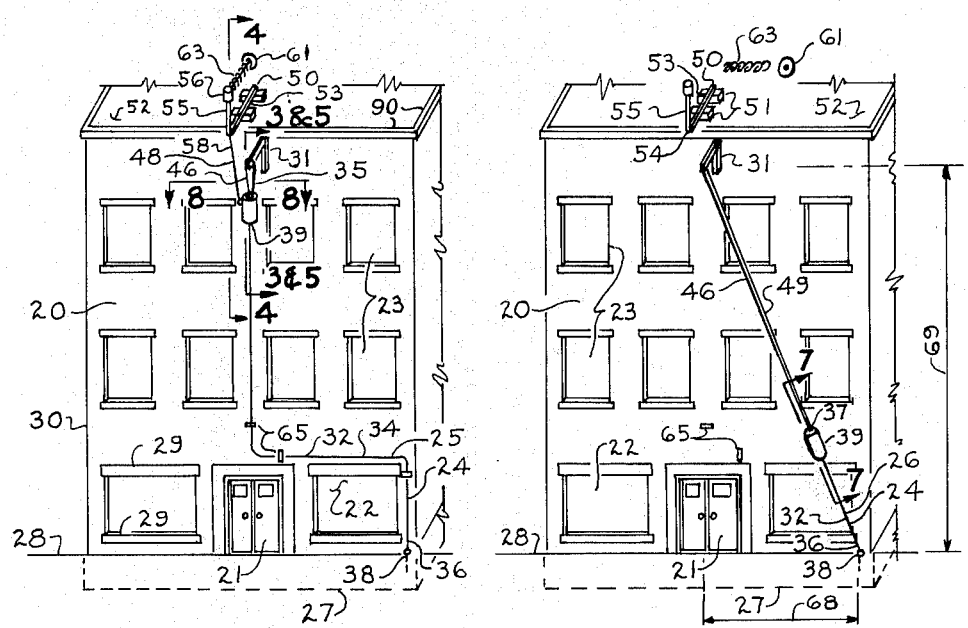
FIG. 1  FIG. 2
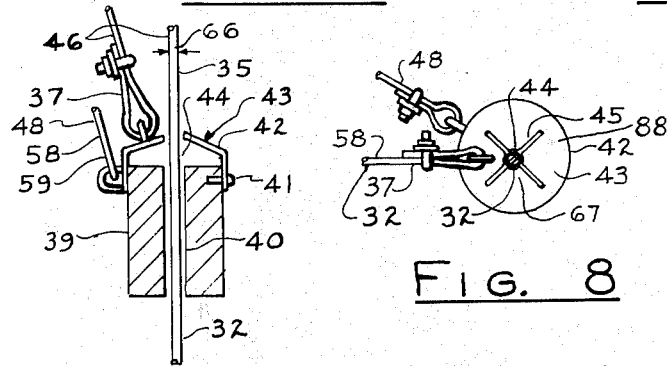
FIG. 5  FIG. 8  FIG. 7
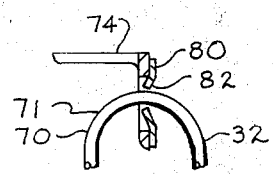 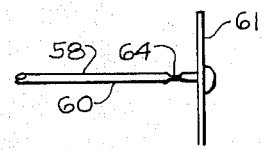 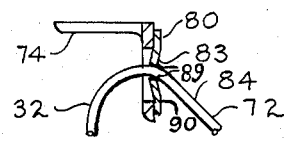
FIG. 13  FIG. 6  FIG. 14
INVENTOR.
Edward Augustus Proctor Feb. 1, 1966 E. A. PROCTOR 3,232,012
AUXILIARY WIND BRACING Filed Feb. 15, 1963 2 Sheets-Sheet 2

INVENTOR.
Edward Augustus Proctor

United States Patent Office 3,232,012
Patented Feb. 1, 1966

3,232,012
AUXILIARY WIND BRACING
Edward Augustus Proctor, 2888 Meadowbrook Blvd.,
Cleveland Heights, Ohio
Filed Feb. 15, 1963, Ser. No. 258,686
2 Claims. (Cl. 52—1)

Tornadoes, hurricanes and other severe wind storms destroy millions of dollars' worth of buildings and other structures in this and in other countries each year.

An atomic explosion develops a sidewardly extending pressure which will topple over buildings in the same manner that a severe wind does.

Therefore it would seem to be urgent to accomplish the object of my invention; namely to provide means for preventing buildings and other tall structures which lack adequate inherent lateral stability from being toppled over and blown down by severe wind storms and atomic explosions.

Because of ever present necessity of practicing economy many buildings have been built of "wall bearing construction." Buildings built of so called "wall bearing construction," because they lack a stiffening steel frame, lack adequate lateral stability and will blow down very readily in a severe wind storm.

There are many buildings constructed by speculative promoters and uninformed builders which are not capable of withstanding severe wind storms in spite of building codes, restrictive laws and capable administration of local and state building departments. These same buildings are easily discerned when strewn over the landscape in the wake of a tornado. Properly engineered buildings generally have adequate inherent lateral stability and will remain standing after a severe wind storm although they too will be damaged to varying degrees.

My auxiliary wind bracing will provide a means to compensate and rectify all past, present and future mistakes, inadequacies, building violations and oversights occurring in building construction by providing a means for augmenting the inherent lateral stability of buildings.

A further object of my invention is to provide an auxiliary wind bracing which can be installed to the exterior of a building or other structure without detracting from the appearance of the structure and without interfering with the normal use of the building, which normal usage will cease or be curtailed during a severe wind storm.

Other objects and a fuller understanding of my invention may be had by referring to the following description and claims, taken in conjunction with the accompanying drawings in which like parts are designated by like reference characters and in which like reference characters designate like parts and in which:

FIGURE 1 is a perspective view of a facade of a building showing my preferred auxiliary wind bracing arranged in a first inactive arrangement involving a slack cable arranged along horizontal and vertical lines between the footing and bracket while creating a pleasing appearance in harmony with the horizontal and vertical lines of the facade.

FIGURE 2 is a perspective view of a facade of a building showing my preferred auxiliary wind bracing arranged in a second active arrangement involving a taut cable stretching tautly diagonally between the footing and bracket while creating an unsightly appearance unharmonious with the horizontal and vertical lines of the facade.

FIGURE 5 is a cross-sectional view taken along line 5—5 as shown in FIGURE 1 and looking in the direction of the attached arrows.

FIGURE 6 is an enlarged view of a portion of the weight suspension means shown in FIGURE 4.

FIGURE 7 is a cross-sectional view taken along line 7—7 as shown on FIGURE 2 and looking in the direction of the attached arrows.

FIGURE 8 is a cross-sectional view taken along line 8—8 as shown on FIGURE 1 and looking in the direction of the attached arrows.

FIGURE 13 is a cross sectional view taken along line 13—13 as shown on FIGURE 9 and looking in the direction of the attached arrows.

FIGURE 14 is a cross sectional view taken along line 14—14 as shown on FIGURE 10 and looking in the direction of the attached arrows.

Figure 3:
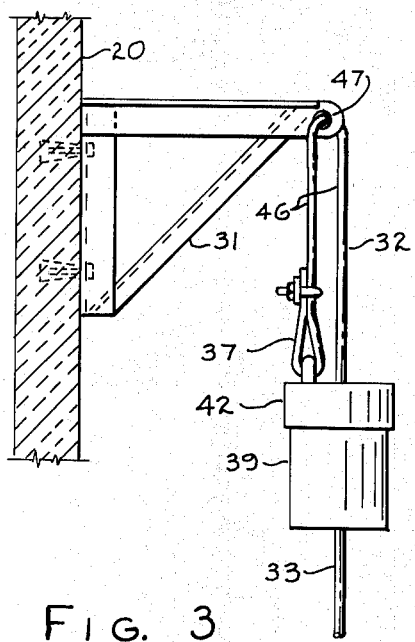
FIGURE 3 is a cross-sectional view taken along line 3—3 as shown in FIGURE 1 and looking in the direction of the attached arrows.

FIGURE 1 is a perspective view of a facade 20 of a typical building having entrance doors 21, first story windows 22 and upper story windows 23. The facade 20 has installed upon it my preferred auxiliary wind bracing 24 in FIGURES 1 and 2, whereas FIGURES 3 through 8 explain various details of my auxiliary wind bracing 24.

The other three sides of the building which have not been shown on my drawings may or may not be similar to the facade 20 which has been shown on my drawings. Generally the side and rear walls of a building contain less and smaller windows and doors than are contained within the front facade 20 herein shown; therefore the rear and side facade of a building should present a minor problem for the installation of my auxiliary wind bracing.

FIGURE 1 illustrates a preferred first inactive arrangement 25 of my preferred auxiliary wind bracing 24. An inactive arrangement of my auxiliary wind bracing would be the arrangement of my auxiliary wind bracing during normal use of the building prior to the occurrences of any severe wind storm.

FIGURE 2 illustrates a preferred second active arrangement 26 of my preferred auxiliary wind bracing 24. An active arrangement of my auxiliary wind bracing would be the arrangement of my auxiliary wind bracing during the occurrence of a severe wind storm when the normal use of the building would be curtailed or eliminated.

My preferred auxiliary wind bracing 24 and my first alternate auxiliary wind bracing to be described later, both have incorporated into themselves suspension means which constitutes a wind sensitive release device, which suspension means when subjected to excessive winds cause the suspended weight to fall causing a rearrangement of my wind bracing 24 from its first inactive arrangement 25 to its second active arrangement 26 shown in FIGURES 1 and 2 respectively as well as effecting the change in arrangement shown between FIGURES 9 and 10 to be described later. The suspension means because it is responsive to severe wind pressures can be called a wind sensitive release device. The change in arrangement represented between arrangements 25 and 26 and the change in arrangement represented between FIGURES 9 and 10 to be described later occur automatically without manual control. In other words a severe wind storm will automatically rearrange the first inactive arrangement 25 of my preferred auxiliary wind bracing 24 shown in FIGURE 1 into the second active arrangement 26 shown in FIGURE 2 without thought, activity or presence by or of any individual. This is very important because during disaster intervals people do very little responsible thinking and are prone to neglect performing tasks since their primary immediate concern is survival.

FIGURES 1 and 2 show that the typical building rests upon first footings 27 embedded within the ground 28. The facade 20 has horizontal lines 29 represented by water tables, window sills, coping and masonry courses. The facade 20 has vertical lines 30 represented by building corners, window and door jambs and ends of masonry units.

My preferred auxiliary wind bracing 24 involves a preferred bracket 31 attached to the facade 20 distantly from the ground 28 at a first position. The preferred auxiliary wind bracing 24 involves a cable 32 having first and second cable portions 34 and 35 respectively. The cable portions 34 and 35 are adjacent to first and second cable ends 36 and 37 respectively. The first cable end 36 is attached to eye bolt 38 embedded within footing 27.

My preferred auxiliary wind bracing 24 involves a slack cable 32 arranged in a preferred first inactive arrangement 25 as shown in FIGURE 1 along horizontal lines 29 and vertical lines 30 between the footing 27 and bracket 31. The first inactive arrangement 25 creates a pleasing harmonizing appearance upon the facade 20.

The cable 32 has a cable diameter 66 shown in FIGURE 5. The second end 37 of cable 32 is attached to a preferred cylindrical weight 39 having a central first opening 40 substantially larger than diameter 66 of cable 32. The preferred cylindrical weight 39 is attached by pins 41 to a first plate type spring fastener 42 involving a flat plate 43 involving a central second opening 44 slightly smaller than diameter 66 of cable 32. The second opening 44 is surrounded by radially extending slots 45 separating a plurality of circumferential yieldable resilient tabs 67 as is shown in FIGURE 8. The second cable portion 35 threading through the second opening 44 induces a first deflection in tabs 67 and a slight inclination of tabs 67 relative to plate 43 as is shown in FIGURE 5. The second cable portion 35 threading through the first and second openings 40 and 44 respectively fashion a loop 46 shown in FIGURES 1 and 2. The loop 46 by virtue of the spring fastener 42 has the equivalent of a one way running knot. The bracket 31 has an opening 47 shown in FIGURE 3 through which loop 46 is threaded and has a running engagement through opening 47.

The preferred cylindrical weight 39 is suspended distantly from the ground 28 along the facade 20 by suspension means 48 which is a wind sensitive release device. Occurrence of excessive wind pressures involves undoing said suspension means 48 thereby actuating the wind sensitive release device causing the preferred cylindrical weight 39 to drop in the manner of a constantly accelerating falling body along the cable 32 in a path guided by cable 32 until the speeding weight 39 is abruptly halted by the total spending of the slackness of cable 32 as is shown in FIGURE 2. The abrupt halt of the weight's descent produces a resultant recoil of the weight and a slight return movement of the cable. Upon the return movement of the cable the circumferential yieldable resilient tabs 67 have induced within them a second deflection opposite to the first deflection previously described in FIGURE 5 thereby reducing their inclination relative to plate 43. The second deflection of resilient tabs 67 produces a tight grip between the spring fastener 42 and the cable 32 as is shown in FIGURE 7 wherein a wedged contact is produced between the end 33 of the resilient tab 67 and the cable 32 and wherein the inclination of the tabs 67 relative to plate 43 is reduced. The spring fastener 42 involves a circumferential portion 88 which restrains tabs 67 from spreading diametrically apart one from another. The firm grip of collet 42 of the cable 32 produces a first taut tie 49 in the preferred second active arrangement 26 shown in FIGURE 2. Inspection of FIGURE 2 reveals the taut tie 49 stretching tautly diagonally across the facade 20 from eye bolt 38 at a second position on footing 27 to a first position of bracket 31. It should be noted that the eye bolt 38 is positioned a horizontal distance 68 and a vertical distance 69 apart from the bracket 31 to produce a diagonal arrangement of taut tie 49. The second arrangement 26 shown in FIGURE 2 produces an unsightly appearance or at least an unharmonious appearance upon the facade 20.

Figure 4:
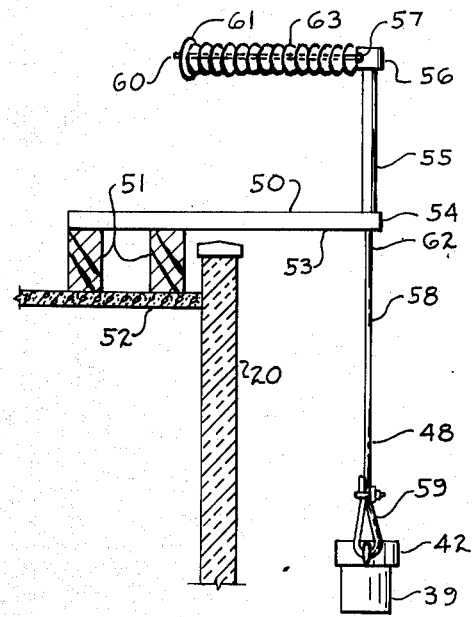
FIGURE 4 is a cross-sectional view taken along line 4—4 as shown in FIGURE 1 and looking in the direction of the attached arrows.

The previously mentioned suspension means 48 involves a support 50 attached by means of blocking 51 to roof 52 as is shown in FIGURE 4. The support 50 involves a horizontal member 53 having an end 54 carrying a vertical tube 55 having an upper end carrying a swivel cap 56 involving a hole 57 the swivel cap 56 being free to swing into any horizontal position. A suspension wire 58 has a first end 59 attached to preferred cylindrical weight 39 as is shown in FIGURE 4. The wire 58 has a second end 60 attached to a flat disk 61. The suspension wire 58 has a central wire portion 62 between ends 59 and 60. The central wire portion 62 is threaded through tube 55, hole 57, and a coiled wire spring 63 as is shown in FIGURE 4. The swivel cap 56 is free to rotate 360 degrees in an unrestricted horizontal rotation, allowing the wind to always maintain a broadside engagement with the disk 61.

FIGURE 6 indicates that the suspension wire 58 has a constricted cross section 64 adjacent to end 60. Excessive wind pressure on disk 61 ruptures suspension wire 58 at this constriction 64 formulating a wind sensitive release device thereby allowing the preferred cylindrical weight 69 to fall as a constantly accelerating falling body along its encasing cable 32 in a path made by the cable 32.

The swivel cap 56 and coiled wire spring 63 permit the wind to engage the flat disk 61 broadside in the same manner that the wind engages a common kite regardless of the direction of the wind or the frequency with which the wind direction changes, since the swivel cap freely rotates in any direction in a horizontal plane.

Inspection of FIGURE 1 reveals my preferred auxiliary wind bracing 24 to be inconspicuous because the cable 32 is draped along harmonizing horizontal lines 29 and harmonizing vertical lines 30 while being temporarily held against the facade 20 by means of clamp 65 which clamps 65 are attached to the facade 20. The cable 32 harmonizes with the lines 29 and 30 of the facade 20. The clamps 65 are of a nature permitting a pulling out of cable 32 from the grasp of the clamps once the preferred cylindrical weight 39 starts to descend upon the undoing of the suspension means 48 which amounts to an actuation of wind sensitive release device as was described previously. Inspection of FIGURE 2 reveals my preferred auxiliary wind bracing 24 to be conspiciously stretched tightly diagonally across the facade 20 between the eye bolt 38 and the preferred bracket 31. The diagonally stretched auxiliary wind bracing is conspicious and unsightly because it does not harmonize with the horizontal lines 29 and vertical lines 30. Since the preferred second arrangement 26 of my preferred auxiliary wind bracing 24 shown in FIGURE 2 occurs only during the occurrence of a severe wind storm, appearance of the building is not a major concern at that time. Rather the ability or inherent lateral stability of the building to withstand the action of the wind storm is the major concern at such crucial times.

After cessation of the wind, the importance of a pleasing appearance of the building facade regains its importance and can be easily satisfied by rearranging my preferred auxiliary wind bracing 24 into the first inactive arrangement 25 shown in FIGURE 1.

I have indicated the first end 36 of cable 32 attached to an eye bolt 38 embedded within the building footing 27. It should be understood that the eye bolt 38 can just as well be embedded within its own auxiliary footing placed near the building footing 27. Whether the existing building footing is used for anchorage of my auxiliary wind bracing or whether a new footing is provided for anchorage of my auxiliary wind bracing, a footing is a necessary element of my invention. There are undoubtedly many variations of means 48 for suspending my preferred cylindrical weight 39. The suspension means 48 or any equivalent wind sensitive release device would have to be sensitive to being released by severe wind pressures. Although any other means besides suspension means 48 which I describe fully would only be an equivalent means I will only mention several of these equivalent wind sensitive release devices for clarification of the intended scope of my invention. My preferred cylindrical weight 39 could be in a first equivalent means rested upon some support, which support could be displaced by excessive wind pressures thereby causing the weight 39 to drop. My preferred cylindrical weight 39 could in a second equivalent means be made to rest precariously upon a support until blown off of the support by an excessive wind thereby again causing the weight 39 to drop as a constantly accelerating falling body. My preferred cylindrical weight 39 could in a third equivalent means be grasped between two fingers with a pressure which would be overcome by excessive wind pressure upon the weight 39 thereby causing it to drop as a constantly accelerating falling body. The important thing in my preferred suspension means 48 and in any equivalent wind sensitive release device means is that excessive wind pressure releases the suspension means thereby causing the weight to drop as a constantly accelerating falling body.

Adding a detailed description of the several above equivalent suspension means and additional claims varying only by the extent of equivalent suspension means will be included in this specification in order to define my invention to its full scope.

Having described my preferred auxiliary wind bracing 24 in detail as to structure and operation I will subsequently describe my first alternate auxiliary wind bracing 70 shown in FIGURES 9 and 10.

FIGURES 9 through 12 amply illustrate my first alternate auxiliary wind bracing 70. The facades of a building have been eliminated from FIGURES 9 and 10 for the sake of simplification.

Figure 9:
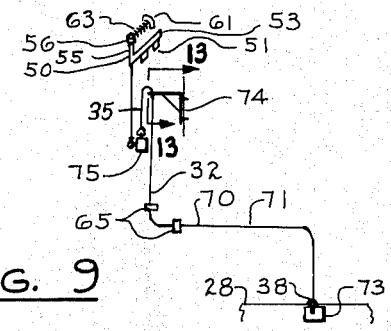
FIGURE 9 is a diagrammatic view of my first alternate wind bracing showing it arranged in an inactive third arrangement involving a slack cable arranged along horizontal and vertical lines between a footing and bracket and dangling beneath the bracket as it would appear in a harmonizing arrangement on the facade of a structure.

FIGURE 9 illustrates my first alternate auxiliary wind bracing 70 in a third inactive arrangement 71. FIGURE 10 illustrates my alternate auxiliary wind bracing 70 in a fourth active arrangement 72.

The third inactive arrangement 71 being intended to exist during normal use of the building and being further intended to be an arrangement harmonizing with the natural horizonal and vertical lines of the building. The fourth active arrangement 72 is intended to occur throughout the duration of a severe wind storm when the normal usage of the building is suspended and when appearance of the building is of minor concern. After the cessation of the severe wind storm, the auxiliary wind bracing 70 can once again be returned to its original third inactive arrangement 71 to once again enhance the appearance of the building facade.

It should be noted once again that a severe wind storm will automatically rearrange my first alternate auxiliary wind bracing 70 from its third inactive arrangement 71 into its fourth active arrangement 72 without any act or consideration by any individual and without dependence upon electrical power or gas supply.

The third inactive arrangement 71 shown in FIGURE 9 illustrates a cable 32 having a first cable end 36 attached to an eye bolt 38 embedded within an auxiliary second footing 73 being located adjacently to the building footing 27 previously described. The cable 32 has a central portion threading through a first alternate bracket 74. The cable 32 has a portion 35 dangling below the first alternate bracket 74. The cable 32 has a second cable end 37 attached to a first alternate cylindrical weight 75 shown in detail in FIGURE 12. My first alternate cylindrical weight 75 is a solid weight devoid of any central opening; such as the central opening 40 of my preferred cylindrical weight 39. Because of this lack of a central opening my first alternate cylindrical weight 75 cannot be guided by the cable 32 similarly as my preferred weight 39 is. Since my first alternate cylindrical weight 75 is in a dangling position below my first alternate bracket 74, the first alternate cylindrical weight 75 should be confined within a building wall cavity or a tube 76 shown only by way of example on FIGURE 10.

My first alternate cylindrical weight 75 has attached loops 77 and 78. The second end 37 of cable 32 attaches to loop 77. The end 59 of suspension wire 58 attaches to loop 78. The suspension wire 58 is an element of my preferred suspension means 48 previously described. The additional elements 50, 51, 53 through 64 constitute the suspension means 48 as previously described.

Figure 11:
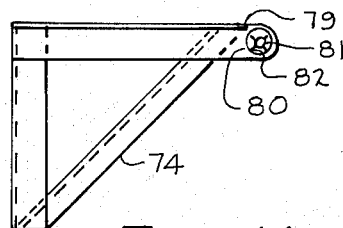
FIGURE 11 is an elevational view of a first alternate bracket.

FIGURE 9 shows clamps 65 retaining the cable 32 in my third inactive arrangement 71. The clamps 65 retain the cable 32 while not impeding the cable's withdrawal from the clamp 65 as the cable rearranges itself into the fourth active arrangement 72. FIGURE 11 shows my first alternate bracket 74. My first alternate bracket 74 has an end 79 having a second plate type spring fastener having a plate 80 having a central opening 81 slightly smaller than diameter 66 of cable 32. The central opening 81 is surrounded by a plurality of radially extending slots 82 fashioning a plurality of yieldable resilient circumferential tabs. The size differential between the diameter 66 of cable 32 and central opening 81 permits the cable 32 to thread through the opening 81 in a first direction as shown in FIGURE 13 while deflecting the tabs 83 a first deflection in the direction of the insertion and inducing a slight inclination of tabs 83 relative to plate 80. Subsequent withdrawal shown in FIGURE 14 of cable 32 in an opposite direction is soon halted because the tabs 83 can deflect back only slightly contrary to the first deflection mentioned above wherein a wedged contact is produced between the end 89 of the resilient tab 83 and the cable 32 as shown in FIGURE 14 and wherein the inclination of the tabs 83 relative to plate 80 is reduced. The spring fastener 80 involves a circumferential portion 88, shown in FIGURE 8 which restrains tabs 83 from spreading diametrically apart one from another. Thus the second plate type spring fastener 80 will allow the insertion through itself of cable 32 in a single direction while immediately grasping the cable upon any attempt to withdraw the cable in a direction contrary to the original insertion. The abrupt halt of the descending weight 39 upon spending the slackness of cable 32 will produce a slight recoil condition, which produces the equivalent of an attempt to withdraw the cable through the spring fastener in a direction contrary to the cable's original insertion through the fastener.

Figure 10:
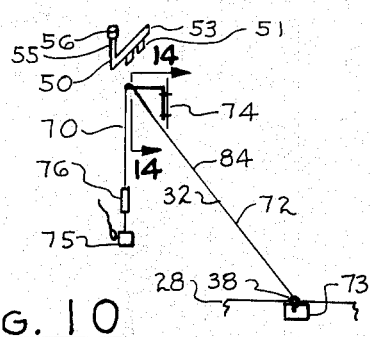
FIGURE 10 is a diagrammatic view of my first alternate wind bracing showing it arranged in an active fourth arrangement involving a portion of taut cable stretching tautly diagonally between a footing and bracket and involving a portion of loose cable dangling below the bracket, the diagonal position of the taut cable creating an unharmonizing appearance to a building facade.
Figure 12:
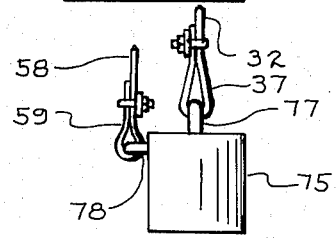
FIGURE 12 is an elevational view of a first alternate weight.

Subsequent to an excessive wind pressure rupturing the suspension wire 58 at constriction 64 and thus allowing alternate cylindrical weight 75 to drop below first alternate bracket 74 as shown in FIGURE 10, the spring fastener 80 firmly grasps the cable 32, a very taut second tie 84 is thereby produced extending from eye bolt 38 to first alternate bracket 74.

The second taut tie 84, as the first taut tie 49, is the bracing means effective in resisting excessive wind upon the structure or building. Inspection of FIGURES 2 and 10 will readily reveal why tieing the brackets 31 and 74 diagonally to some footing will resist the horizontal forces of the wind. Of course in actual practice the brackets 31 and 74 would be tied to a footing by taut ties diverging from the bracket on opposite sides: since the taut ties 49 and 84 which I indicate would resist the wind from one direction only.

It is quite obvious that the second plate type spring fastener 80 shown in FIGURE 11 could be fastened directly to a building facade such as facade 20 without using any bracket such as the first alternate bracket 74 which I have indicated.

Although I have described my invention with a certain degree of particularity, it is understood that the present disclosure has been made only by way of example and that numerous changes in the details of construction and the combination and arrangement of parts may be resorted to without departing from the spirit and scope of the invention hereinafter claimed.

I claim as my invention:

1. An auxiliary wind bracing for augmenting the inherent lateral stability of a tall structure having walls resting upon a footing embedded within the ground, the walls involving facades having both horizontal and vertical lines, the facades comprising a windward facade and a parallel leeward facade and transverse facades transverse to the windward facade the auxiliary wind bracing comprising in combination, a bracket, a cable, a spring fastener and a wind sensitive release device, the bracket being attached to one of the tranverse facades distantly from the ground at a first position, the cable having a cable diameter, first and second cable end portions adjacent to respective first and second cable ends, the cable being arranged along one of the transverse facades the first cable end being attached to the footing at a second position horizontally and vertically distant from the first position of the bracket, the auxiliary wind bracing comprising a slack cable arranged in a first inactive arrangement along and in harmony with horizontal and vertical lines of the transverse facade between the footing and bracket, the second end of the cable being attached to a weight having a central first opening greater than the cable diameter, the weight having attached a flat plate type spring fastener comprising a plate having a center portion inside of a circumferential portion, the center portion having a second opening slightly smaller than the cable diameter, the second opening being surrounded by radially extending slots separating a plurality of circumferentially arranged yieldably resilient flat tabs, the tabs having first ends surrounding the second opening, the tabs having second ends attached to the circumferential portion, the tabs being restrained from spreading diametrically apart one from another by the circumferential position, the second cable end portion threading through the first and second openings while first deflecting the tabs into a slight inclination relative to the plate, the second end portion of the cable fashioning a loop having a running engagement with the bracket, the weight being suspended distantly from the ground by suspension means constituting a wind sensitive release device, excessive wind pressure rupturing the suspension means causing the weight to drop adjacently to the transverse facade at nearly the constantly accelerating speed of any freely falling body along the cable which it encases while being guided by the cable until the weight is abruptly halted by the total spending of the slackness of the cable, the abrupt halt of the weight's descent produces a resultant recoil wherein a slight return movement of the cable through the spring fastener causes a second deflection of the yieldably resilient tabs opposite to their first deflection causes a wedged contact between the first ends of the tabs and the cable causing an attachment of the spring fastener to the cable thereby producing a taut tie in a second active arrangement tightly stretching diagonally across the transverse facade from the footing to the bracket the second arrangement of the cable detracting from the appearance of the transverse facade whereas the first arrangement of the cable harmonizes with the lines of the transverse facade, the auxiliary wind bracing being rearranged from a first inactive arrangement along a transverse facade into a second active arrangement without the assistance of a human upon an occurrence of a high wind causing the elevated weight to drop earthward adjacent to a tranverse facade.

2. An auxiliary wind bracing for augmenting the inherent latent stability of a tall structure having walls resting upon first footings embedded within the ground, the ground having embedded therein second footings, the walls involving facades having both horizontal and vertical lines, the facades involving a windward facade and transverse facades transverse to the windward facade the auxiliary wind bracing comprising in combination the second footing, a cable, a bracket, a spring fastener and a wind sensitive release device, the bracket being attached to one of the transverse facades distantly from the ground at a first position, the cable having a cable diameter, first and second cable end portions adjacent to respective first and second cable ends, the cable being arranged along one of the transverse facades the first cable end being attached to the second footing at a second position horizontally and vertically distant from the first position of the bracket, the bracket including a flat plate type spring fastener comprising a plate having a center portion inside of a circumferential portion, the center portion having a first opening slightly smaller than the cable diameter, the first opening being surrounded by radially extending slots separating a plurality of circumferentially arranged flat resilient tabs, the tabs having first tab ends surrounding the hole, the tabs having second ends attached to the circumferential portion, the tabs being restrained from spreading diametrically apart one from another by the circumferential portion, the slack cable being arranged in a first inactive arrangement in slack condition along and in harmony with horizontal and vertical lines of said transverse facade between the second footing and the bracket and immediately below the bracket, the second end of the cable threading through the first opening while first deflecting the tabs fashioning a dangling cable portion immediately below the bracket, the second cable end being attached to a weight suspended distantly from the ground adjacent to the transverse facade by suspension means constituting said wind sensitive release device, excessive wind pressure rupturing the suspension means allowing the weight to drop vertically below the bracket adjacently to the transverse facade at nearly the constantly accelerating speed of a freely falling body, while dragging the cable through the spring fastener until abruptly halted by the total spending of the slackness of the cable, the abrupt halt of the weight's descent producing a resultant recoil movement of the cable through the spring fastener causing a second deflection of the tabs opposite to their first deflection causing the first ends of the resilient tabs to tightly wedge against the cable causing an attachment of the fastener to the cable thereby producing a taut tie in a second active arrangement tightly stretching diagonally across the facade from the second footing to the bracket the second arrangement of the cable detracting from the appearance of the transverse facade whereas the first arrangement of the cable harmonizes with the lines of the transverse facade, the suspension means further comprising a vertical tube having an upper end carrying a cap free to swing in all horizontal directions, the cap having a hole, a supsension wire having a constricted portion, a first lower end of a wire attached to the weight and a second upper end of said wire attached to a flat disk, the wire threading through the tube and hole in the cap, the swivel cap providing a broad side engagement of the wind with the disk regardless of the direction of the wind, the auxiliary wind bracing being rearranged from a first inactive arrangement along a transverse facade into a second active arrangement without the assistance of a human upon an occurrence of a high wind causing an elevated weight to drop earthward adjacently to a transverse facade.

References Cited by the Examiner

UNITED STATES PATENTS

| | | | |
|---|---|---|---|
| 280,937 | 7/1883 | Looney | 188—65.1 X |
| 488,137 | 12/1892 | Uren | 14—42 |
| 1,175,159 | 3/1916 | Lyons | 20—1.4 |
| 1,252,387 | 1/1918 | Bergen | 135—15 |
| 2,845,673 | 8/1958 | Weis | 24—123 X |

FOREIGN PATENTS 283,749   3/1931   Italy.

FRANK L. ABBOTT, *Primary Examiner.*

JACOB L. NACKENOFF, *Examiner.*

K. E. PAYNE, L. R. RADANOVIC, *Assistant Examiners.*